United States Patent
Fournier et al.

(10) Patent No.: US 7,215,965 B2
(45) Date of Patent: May 8, 2007

(54) FACILITY AND METHOD FOR WIRELESS TRANSMISSION OF LOCATION DATA IN A VOICE CHANNEL OF A DIGITAL WIRELESS TELECOMMUNICATIONS NETWORK

(75) Inventors: Andre F. A. Fournier, Poulsbo, WA (US); Allen A. Jahani, Bainbridge Island, WA (US); Michael S. Sawyer, Bainbridge Island, WA (US); Stephen M. Grant, Bainbridge Island, WA (US)

(73) Assignee: Airbiquity Inc., Seattle, WA (US)

( * ) Notice: Subject to any disclaimer, the term of this patent is extended or adjusted under 35 U.S.C. 154(b) by 590 days.

(21) Appl. No.: 10/016,631

(22) Filed: Nov. 1, 2001

(65) Prior Publication Data

US 2003/0083080 A1    May 1, 2003

(51) Int. Cl.
*H04Q 7/20* (2006.01)
*H04M 11/04* (2006.01)
*H04B 7/185* (2006.01)

(52) U.S. Cl. .............................. 455/456.1; 455/404.2; 342/357

(58) Field of Classification Search ............. 455/552.1, 455/550.1, 556.1, 557, 551, 572, 575.1, 343.6, 455/553.1, 556.2, 90.3, 573, 456.1, 456.3, 455/404.2, 575.6; 342/457, 357
See application file for complete search history.

(56) References Cited

U.S. PATENT DOCUMENTS

| | | | |
|---|---|---|---|
| 3,985,965 A | 10/1976 | Field et al. | |
| 4,776,003 A | 10/1988 | Harris | |
| 4,831,647 A | 5/1989 | D'Avello et al. | |
| 4,860,336 A | 8/1989 | D'Avello et al. | |
| 4,965,821 A | 10/1990 | Bishop et al. | |
| 4,977,609 A | 12/1990 | McClure | |
| 5,043,736 A | 8/1991 | Darnell et al. ............... 342/357 |
| 5,201,071 A | 4/1993 | Webb .......................... 455/101 |
| 5,208,446 A | 5/1993 | Martinez | |
| 5,235,633 A | 8/1993 | Dennison et al. ............. 379/60 |
| 5,272,747 A | 12/1993 | Meads | |

(Continued)

FOREIGN PATENT DOCUMENTS

EP    0 512 789 A2    5/1992

(Continued)

OTHER PUBLICATIONS

PCT International Search Report dated Nov. 27, 2000 for International Application No. PCT/US00/13288.

(Continued)

*Primary Examiner*—Tilahun Gesesse
(74) *Attorney, Agent, or Firm*—Stoel Rives LLP

(57) ABSTRACT

A wireless communication facility and method employs a mobile unit having a number of alternative modes of digital wireless communication. The unit may be a battery pack or other accessory device attachable to a wireless telephone handset. The mobile unit is operated to assess some characteristic of each of the alternative modes, and based on the assessment, a preferred mode is determined. Data is transmitted via the preferred mode. The unit may include a GPS locator, so that the transmitted data may include the location of the unit. A call center is connected via the modes, and receives the data for processing, such as to return information to the user about the location.

34 Claims, 3 Drawing Sheets

U.S. PATENT DOCUMENTS

| | | | |
|---|---|---|---|
| 5,301,223 A | 4/1994 | Amadon et al. | |
| 5,334,824 A | 8/1994 | Martinez | |
| 5,338,148 A | 8/1994 | Ronnblom | |
| 5,365,450 A | 11/1994 | Schuchman et al. | 364/449 |
| 5,388,147 A | 2/1995 | Grimes | 379/59 |
| 5,408,513 A | 4/1995 | Busch, Jr. et al. | |
| 5,410,739 A | 4/1995 | Hart | 455/66 |
| 5,422,816 A | 6/1995 | Sprague et al. | 364/449 |
| 5,444,763 A | 8/1995 | Lazaridis et al. | |
| 5,473,676 A | 12/1995 | Frick | |
| 5,479,475 A | 12/1995 | Grob et al. | |
| 5,479,480 A | 12/1995 | Scott | 379/59 |
| 5,483,549 A | 1/1996 | Weinberg et al. | 375/200 |
| 5,519,403 A | 5/1996 | Bickley et al. | 342/352 |
| 5,539,810 A | 7/1996 | Kennedy, III et al. | |
| 5,546,445 A | 8/1996 | Dennison et al. | 379/60 |
| 5,550,897 A | 8/1996 | Seiderman | |
| 5,555,286 A | 9/1996 | Tendler | 379/59 |
| 5,572,204 A | 11/1996 | Timm et al. | 340/988 |
| 5,587,715 A | 12/1996 | Lewis | 342/357 |
| 5,630,206 A | 5/1997 | Urban et al. | 455/54 |
| 5,640,444 A | 6/1997 | O'Sullivan | |
| 5,686,910 A | 11/1997 | Timm et al. | 340/988 |
| 5,687,215 A | 11/1997 | Timm et al. | 379/58 |
| 5,711,013 A | 1/1998 | Collett et al. | 455/558 |
| 5,712,899 A | 1/1998 | Pace, II | 379/58 |
| 5,722,066 A | 2/1998 | Hu | |
| 5,726,893 A | 3/1998 | Schuchman et al. | 364/449.7 |
| 5,726,984 A | 3/1998 | Kubler et al. | 370/349 |
| 5,729,591 A | 3/1998 | Bailey | |
| 5,732,346 A | 3/1998 | Lazaridis et al. | |
| 5,786,789 A * | 7/1998 | Janky | 342/357.1 |
| 5,797,091 A | 8/1998 | Clise et al. | 455/404 |
| 5,812,087 A | 9/1998 | Krasner | 342/357 |
| RE35,916 E | 10/1998 | Dennison et al. | 455/456 |
| 5,822,360 A | 10/1998 | Lee et al. | |
| 5,850,599 A | 12/1998 | Seiderman | |
| 5,862,183 A | 1/1999 | Lazaridis et al. | |
| 5,907,801 A | 5/1999 | Albert et al. | |
| 5,945,944 A | 8/1999 | Krasner | 342/357.06 |
| 5,946,304 A | 8/1999 | Chapman et al. | |
| 5,946,611 A | 8/1999 | Dennison et al. | 455/404 |
| 5,970,130 A | 10/1999 | Katko | 379/201 |
| 5,978,676 A | 11/1999 | Guridi et al. | 455/426 |
| 5,991,410 A | 11/1999 | Albert et al. | |
| 6,002,363 A | 12/1999 | Krasner | 342/357.1 |
| 6,014,561 A * | 1/2000 | Molne | 455/419 |
| 6,021,163 A | 2/2000 | Hoshi | 375/272 |
| 6,044,257 A | 3/2000 | Boling et al. | 455/404 |
| 6,061,557 A | 5/2000 | Lazaridis et al. | |
| 6,070,089 A | 5/2000 | Brophy et al. | |
| 6,091,969 A | 7/2000 | Brophy et al. | |
| 6,101,398 A | 8/2000 | Joong et al. | |
| 6,122,514 A | 9/2000 | Spaur et al. | |
| 6,140,956 A | 10/2000 | Hillman et al. | 342/357.07 |
| 6,144,336 A | 11/2000 | Preston et al. | |
| 6,157,845 A * | 12/2000 | Henry et al. | 455/426.1 |
| 6,226,529 B1 * | 5/2001 | Bruno et al. | 455/557 |
| 6,230,024 B1 | 5/2001 | Wang et al. | |
| 6,275,990 B1 | 8/2001 | Dapper et al. | 725/106 |
| 6,327,303 B1 | 12/2001 | Balogh et al. | |
| 6,345,251 B1 | 2/2002 | Jansson et al. | |
| 6,351,495 B1 | 2/2002 | Tarraf | |
| 6,377,804 B1 * | 4/2002 | Lintulampi | 455/435.2 |
| 6,456,858 B1 * | 9/2002 | Streter | 455/552.1 |
| 6,463,298 B1 * | 10/2002 | Sorenson et al. | 455/552.1 |
| 6,600,931 B2 * | 7/2003 | Sutton et al. | 455/552.1 |
| 6,677,894 B2 * | 1/2004 | Sheynblat et al. | 342/357.1 |
| 6,681,121 B1 * | 1/2004 | Preston et al. | 455/556.1 |
| 6,799,050 B1 * | 9/2004 | Krasner | 455/456.1 |
| 6,923,301 B2 | 8/2005 | Souissi et al. | |
| 2001/0036174 A1 | 11/2001 | Herring | |
| 2001/0055980 A1 | 12/2001 | Sato | |
| 2002/0001317 A1 | 1/2002 | Herring | |
| 2002/0015424 A1 | 2/2002 | Preston et al. | |
| 2002/0068608 A1 * | 6/2002 | Souissi | 455/557 |
| 2002/0077131 A1 * | 6/2002 | Mizell et al. | 455/466 |
| 2002/0082045 A1 | 6/2002 | Fujioka et al. | |
| 2002/0090975 A1 | 7/2002 | Laiho et al. | |

FOREIGN PATENT DOCUMENTS

| | | |
|---|---|---|
| EP | 0 545 783 A1 | 6/1993 |
| EP | 0 545 783 B1 | 6/1993 |
| GB | 2 188 516 A | 9/1987 |
| JP | 02050634 A | 2/1990 |
| WO | WO 89/12835 | 12/1989 |
| WO | WO 96/18275 | 6/1996 |
| WO | WO 96/24197 A1 | 8/1996 |
| WO | WO 98/53573 | 11/1998 |
| WO | WO 99/49677 | 9/1999 |
| WO | WO 00/11893 | 3/2000 |

OTHER PUBLICATIONS

Mueller, A.J., et al., "A DSP Implemented Dual 9600/7200 BPS TCM Modem for Mobile Communications Over FM Voice Radios," Proceedings of the 1997 6th IEEE Pacific Rim Conference on Communications, Computers and Signal Processing, vol. 2, Aug. 20-22, 1997, pp. 758-761, IEEE, New York, New York.

Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, Nov. 27-30, 1989, pp. 1075-1079, IEEE, New York, New York.

Lin, D., et al., "Data Compression of Voiceband Modem Signals," 40th IEEE Vehicular Technology Conference: On the Move in the 90's. May 6-9, 1990, pp. 323-325, IEEE, New York, New York.

PCT International Search Report dated Jan. 3, 2002 for International Application No. PCT/US01/20021.

PCT International Search Report dated Oct. 2, 2002 for International Application No. PCT/US02/02388.

PCT International Search Report dated Aug. 28, 2002, for International Application No. PCT/US02/13580.

Coleman, Alan, Gleiss, Norman, Sotscheck, Jocham, Usal, Paolo, Scheurermann, Helmut, "Subjective Performance Evaluation of the RPE-LTP Codec for the Pan-European Cellular Digital Mobile Radio System," Globecom '89, IEEE Global Telecommunications Conference and Exhibition, vol. 2, 27-30, Nov. 1989, pp. 1075-1079, IEEE, New York, New York.

* cited by examiner

FACILITY AND METHOD FOR WIRELESS TRANSMISSION OF LOCATION DATA IN A VOICE CHANNEL OF A DIGITAL WIRELESS TELECOMMUNICATIONS NETWORK

FIELD OF THE INVENTION

The present invention is directed to wireless communication, and more particularly to wireless data communication employing a detachable accessory battery pack with communication functionality via all of the transmitting methods including Short Message Service and other packet data modes, and voice.

BACKGROUND AND SUMMARY OF THE INVENTION

Some wireless telephone users need to send or receive digital data. Such data may include computer data files, stock quotes, personal calendar data, business contact information, and innumerable other data subjects. Existing wireless telephone users are able to transmit such data, but with limitations on the transmission speed, economy, and location.

There are several different modes of wireless data transmission, with new alternative modes expected to be developed and implemented as technology progresses. Current modes include packet data transport modes such as SMS (Short Message Service), 1XRTT (Multi-Carrier 1X), GPRS (General Packet Radio Services), 3XRTT (Multi-Carrier 3X), and UMTS (Universal Mobile Telecommunication System), EDGE (Enhanced Data rates for GSM and TDMA Evolution), CDPD (Cellular Digital Packet Data) and Blue-Tooth. Various of these are adapted for use in conjunction with the various digital cellular voice transmission mode such as CDMA, GSM, and TDMA.

While of each of these is reasonably effective where implemented, no one mode is superior in all areas and instances. Even where a region is covered by one mode, there are localized areas where coverage is weak or unavailable. Thus, conventional digital cellular modems using any one mode are of limited use on some occasions when needed. The typical mode is for the user to employ a CDPD modem, which operates in only one mode.

To reduce the disadvantages of being tied to a single mode, one system employs the WAP (Wireless Access Protocol) communication standard and SMS. If a user fails to achieve digital data communication by the default mode of the handset, the user may manually select the alternate mode, and attempt to communicate in hopes that the second mode is effective. This is essentially a back up for when failure occurs, and is often an inconvenience to the user. Moreover, a marginal transmission may in fact occur with the first mode, but at relative high cost (either to the user or the carrier, such as when bandwidth is restricted), at relatively low speed, or with possible corruption of data. This marginal transmission may occur while the back-up mode was able to provide much better service, with that opportunity being lost because the user never was aware (in the absence of a complete failure of the primary mode) of the benefits of switching to the back up mode.

This system has the additional disadvantage in that it is incorporated into a hand set. Thus, as voice or data transmission technologies change, the entire handset may become obsolete, even when one aspect remains effective. In addition, a user opting to upgrade to data capability after owning a conventional handset must discard the handset.

One type of digital data transmission is locational data, such as provided by a GPS (Global Positioning System) receiver. Hand sets have included GPS capability, although these suffer from the disadvantage noted above in that one aspect of the unit may become obsolete before the other. In the case of expensive GPS circuitry, a user may occasionally wish to upgrade a telephone, except that the appreciable investment in a still-current GPS unit makes an upgrade unaffordable. GPS units have been used in conjunction with wireless handsets to collect and transmit GPS location data to a call center, which converts the data to a useful format such as a graphical GIF image, and transmits the image for viewing on the handset's display screen. While useful in some circumstances, this has limited use in transmitting the information to other remote units, or for actuation of location functions from anyone but the holder of the handset.

The present invention overcomes the limitations of the prior art by providing a method, device, and system for wireless communication of digital data that employs a mobile unit having a number of alternative transmission modes of digital wireless communication. The unit may be a battery pack or other accessory device attachable to a wireless telephone handset. The mobile unit is operated to assess some characteristic of each of the alternative transmission modes, and based on the assessment, a preferred mode is determined. Data is transmitted via the preferred mode. The unit may include a GPS locator, so that the transmitted data may include the location of the unit. A call center is connected via the Internet Protocol and/or through the Public Switch Telecommunication Network, and receives the data for processing, such as to return information to the user about the location.

DETAILED DESCRIPTION OF A PREFERRED EMBODIMENT

The following description and drawings proceed using terminology that is typically expressed with acronyms and abbreviations best understood by the following glossary:

Cellular Network 1st Generation:
  AMPS Advance Mobile Phone System
Cellular Network 2nd Generation:

| | |
|---|---|
| SMS | Short Message System |
| WAP | Wireless Application Protocol |
| CDMA | Code Division Multiple Access |
| TDMA | Time Division Multiple Access |
| GSM | Global System for Mobile |
| CDPD | Cellular Digital Packet Data |

Cellular Network 2.5 Generation:

| | |
|---|---|
| 1XRTT | Multi-Carrier 1X (specific to CDMA only) |
| GPRS | General Packet Radio Services (GSM and TDMA) |

Cellular Network 3 Generation:

| | |
|---|---|
| 3XRTT | Multi-Carrier 3X (specific to CDMA only) |
| UMTS | Universal Mobile Telecommunication System (specific to GSM and GPRS migration) |
| EDGE | Enhanced Data rates for GSM and TDMA Evolution |

Internet Protocol:
  TCP-IP Transport Control Protocol—Internet Protocol
Telecommunication terms:

| | |
|---|---|
| LEC | Local Exchange Carrier |
| PSTN | Public Switch Telecommunication Network |

Figure 1:
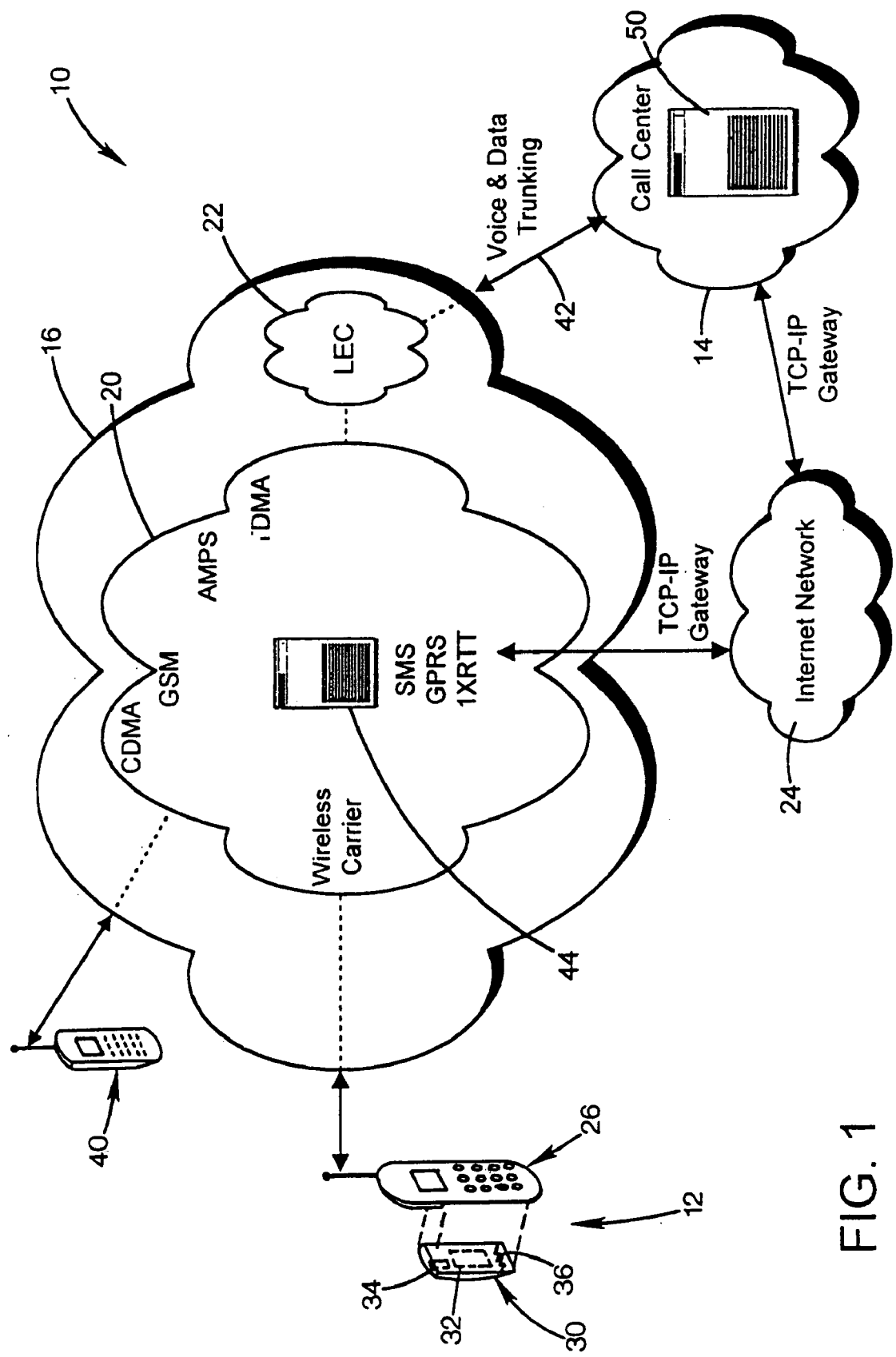
FIG. 1 is a high-level block diagram showing the environment in which the facility preferably operates.

Wireless Network
  Blue Tooth, a 2.4 Ghz short range radio transceiver protocol
  802.11, a 2.4 Ghz protocol used for wireless internet
  HomeRF, a 2.4 Ghz wireless internet access protocol FIG. 1 shows a telecommunications system 10 in which a portable handset 12 communicates with a call center 14. A telecommunication network 16 includes a wireless carrier network 20 connected to a Local Exchange Carrier (LEC) 22, and to an Internet network 24.

The handset 12 includes a conventional digital cellular telephone 26 and a detachable accessory module 30. The accessory module may include a battery or attached to a battery pack by some means or interfaces directly to the phone via the cellular communication interface bus, hence not needing to have a battery. The accessory module includes a Global Positioning System (GPS) circuit 32, which includes an antenna for receiving radio signals broadcast from a network of GPS satellites to identify the location of the module. A user-actuated button 34 on the exterior of the module triggers the circuitry to collect the location data, which is gathered in an initial format that requires processing to convert it into a useful form that may be read by the user. An electrical connector 36 on the accessory interfaces with a connector on the handset to transmit the GPS data to the handset for transmission to the wireless network. In alternative embodiments, the accessory may lack the GPS functionality, but have other functions that generate, receive, and or collect digital data. This may include conventional modem cards that receive data from a personal computer, personal data assistant (PDA) modules that store address and calendar information, cameras, biometric transducers and other type of data generating devices. By placing the non-telephone functionality in the accessory, a user may add the functionality after acquiring a phone, and may switch among wireless providers using different communications modes without abandoning the accessory.

The Wireless network 20 operates using a set of geographically-distributed transceiver stations that may have the capability to communicate by way of any of numerous alternative communication protocols or modes using radio frequency bands. In addition to analog modes, there are numerous digital modes. These include iDEN, CDMA, GSM, AMPS, and TDMA. In addition, there are several digital data packet transport modes such as SMS, GPRS, and 1XRTT, which are used for transmission of digital data, as opposed to the transmission of acoustic voice patterns in a digital format. The wireless network will generally employ several, but not all, of the modes. For instance, a typical CDMA system would support voice, and for data it would support SMS and/or 1XRTT as communication modes, but it would not support GPRS. Regardless of which and how many different modes the system can employ, there is at least one voice transmission mode, and one packet data mode, so that the user may use his phone handset conventionally for voice calls, or for data transmission. Other handsets 40 are also operable to connect to the wireless network, so that they may communicate with the call center, or provide voice or data communication among two or more handsets.

The wireless carrier network is connected to the Local Exchange Carrier 22, so that wireless calls from the network are transmitted along conventional land lines 42 to all other possible telephone users, including the call center 14. While it is generally preferable to use "hard wire" or land lines to transmit calls, some wireless communication may be employed in addition to the connection between the first handset and the wireless network. For instance, the call center 14 may connect to its own associated wireless network, or may be connected to the same network in the manner of phone 40. Nonetheless, line 42 represents any line or mode of voice communication that may normally be employed for conventional communication of acoustic signals, such as voice calls, modem tones, and the like, whether transmitted in analog format or encoded in digital format.

The wireless carrier network is also connected to the Internet network 24 via a conventional TCP-IP or other connection useful for high speed data transmission. The wireless network includes a packet data transport server 44 that is connected within the wireless network to receive selected calls from remote handsets, and to convert the call data to a useful format that may be transmitted via the Internet to the Call Center 14. The packet data server is adapted to convert one of the packet data communications modes such as SMS, GPRS, and 1XRTT. Other servers may be used in the same wireless system to convert additional modes, so that a choice of packet data modes may be offered to a user in the geographical area of the wireless carrier.

The call center includes a call center server 50 connected to the LEC via line 42, and to the Internet 24. The call center server operates to receive data from the user's handset accessory 30, and processes it into a useful format that is either used by personnel or other systems in the call center, or transmitted back to the user for use by the user. The call center operates for two way communication over both the voice and data lines illustrated. The detailed functional capabilities and options for the call center will be discussed below.

Figure 2:
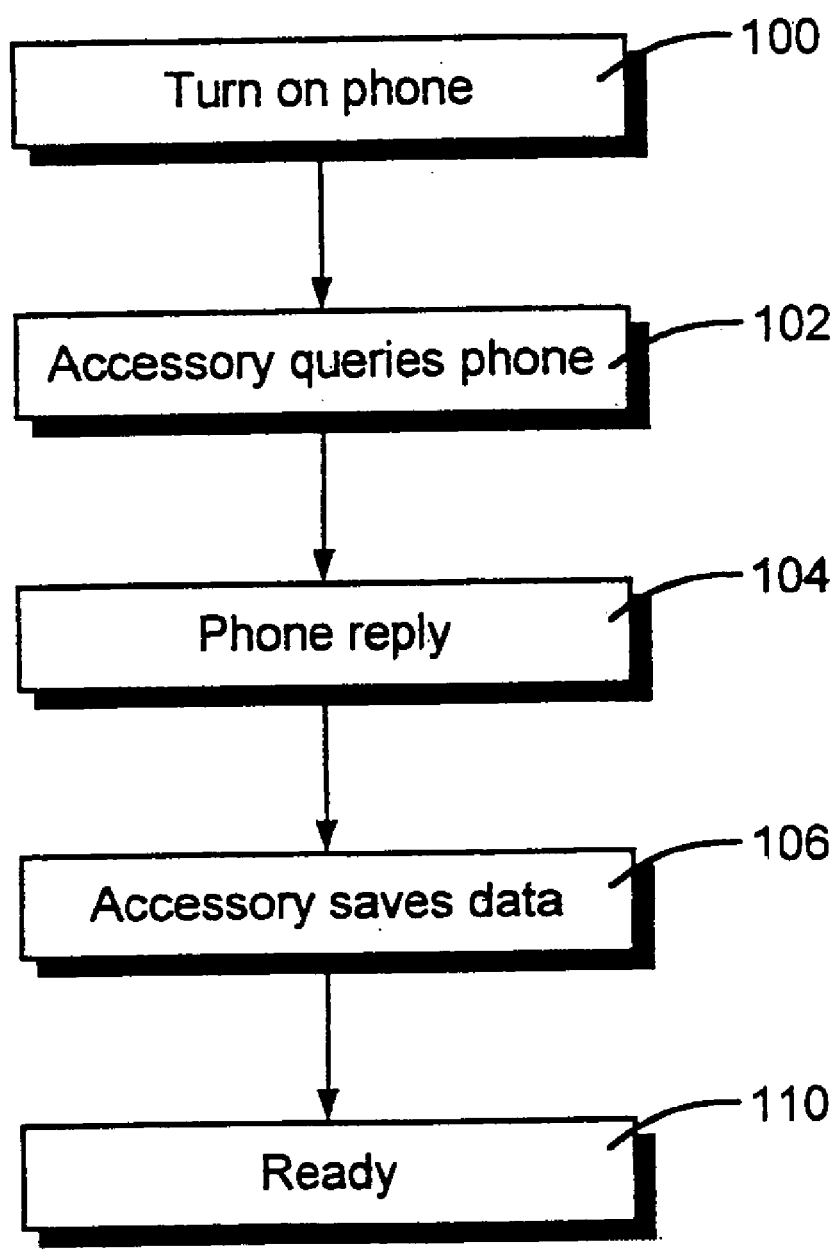
FIG. 2 is a flow chart illustrating operation according to a preferred embodiment of the invention.

FIG. 2 shows the steps for initialization of the accessory 30. In step 100, the user turns on the telephone 26, which provides power to the accessory for operation to begin. In step 102, the accessory queries the phone to determine which communications modes the phone supports. This includes possible analog and/or digital voice communication modes, and data transmission and receipt modes such as packet data modes. In the preferred embodiment, the phone will offer at least one voice mode and at least one packet data mode. In step 104, the phone replies to the accessory's query its the phone's transmission capability such as:

| Voice | Digital | coverage |
|---|---|---|
| SMS | Enable | Coverage |
| GPRS | Enable | No Coverage |

Consequently, the accessory has a good understanding of the phone's transmission capabilities and can use any of them based on its configured preference. In step 106, the accessory receives the phone information, and saves it to a transport policy management table in a storage device in the accessory, so that the accessory knows what format of data may be readily used by the phone for transmission via the network to the call center, and is ready to send data per step 110. Once the accessory has saved the identity of the available data transmission mode(s) (a.k.a. phone transport medium), in advanced embodiments, the user may configure the device to generate a particular data type suited to a selected mode. For instance, the user can configure the accessory to use the phone's voice capability when he dials 911, because this is the most readily available transport medium. The user can further configure the accessory to use GPRS when using his credit card to purchase an item, this mode of transmission is of higher bandwidth and allows quick validation. Similarly, this method could be use to download stock prices and other financial data. In some embodiments, this capability may be accessed via a computer or hand held device such as a PDA, which may have an input device and display with greater capabilities than that of the phone or accessory.

Figure 3:
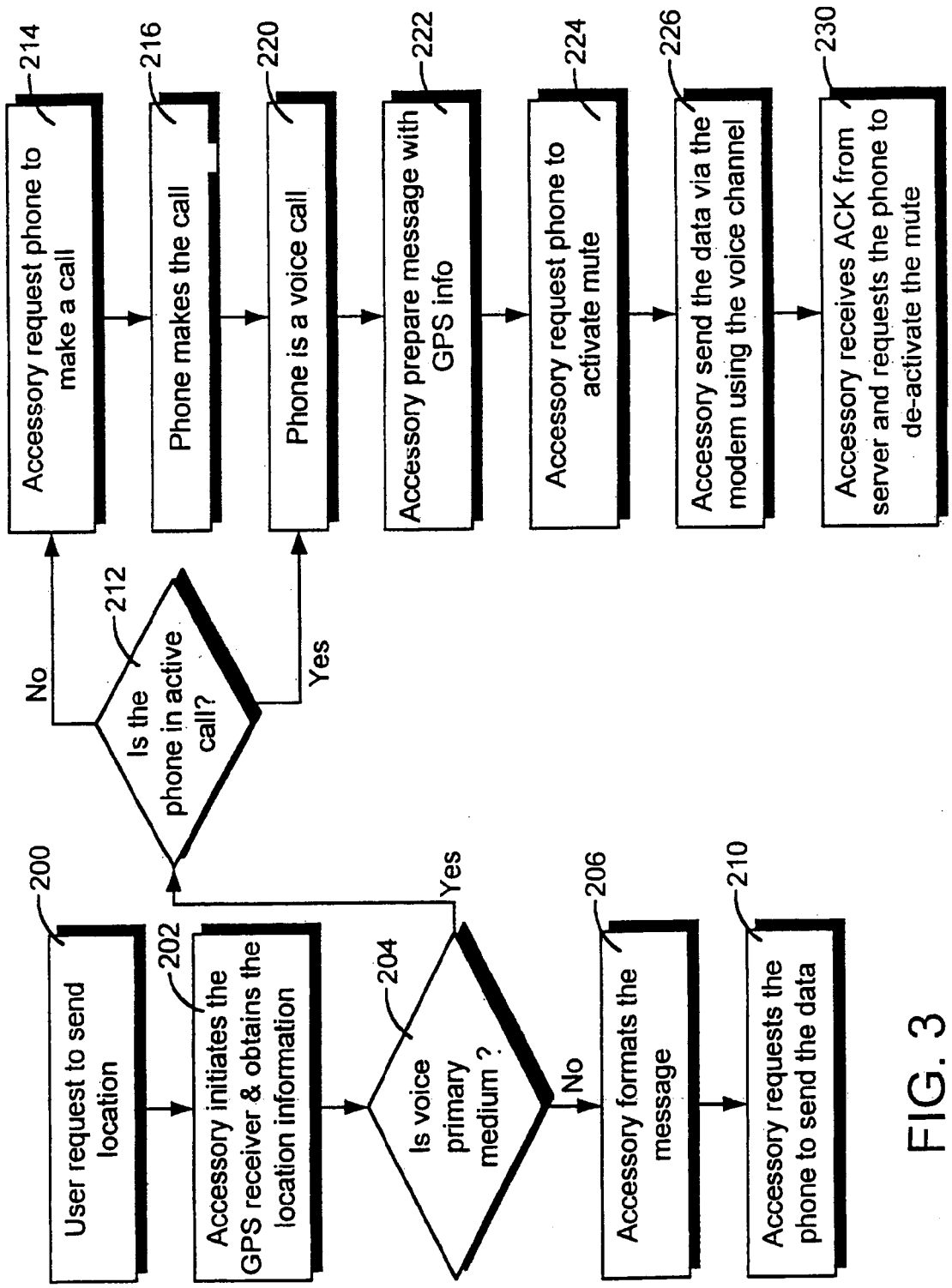
FIG. 3 is a flow chart illustrating operation according to a preferred embodiment of the invention.

FIG. 3 shows the operation of the accessory in an instance in which the user wishes to send information about his location to the call center. In step 200, the user initiates a request to transmit his location. This is initiated by actuation of the button 34 on the accessory or via an SMS-like message sent to the accessory from the handheld device such as PDA, PC or pager, or initiated by the Call Center. In response, in step 202, the accessory activates the GPS circuitry to receive GPS signal data from the GPS satellites, and stores this data in the accessory memory circuitry. In the accessory, the GPS receiver converts this data to a Reverse-Geo text format which may contain: latitude, longitude, Dilution of Precision (the accuracy of the position solution, also known as DOP), heading, (i.e. the inferred direction of motion of the user based on prior cells in which the user was located), altitude, or pseudo range (i.e. the raw distance between the GPS accessory, in this case, and the GPS satellite which would include geo-spatial errors), geo fencing criteria (such as whether the user is within a predetermined geographical boundary), and NMEA sentence output (National Marine Electronics Association standard positioning data format). Inasmuch as additional location information may be desired by the users, the data is sent to the call center for processing.

In step 204, the accessory circuitry determines whether voice is the primary medium. This means determining whether the phone's voice transmission mode is capable of data transmission, and if so, whether the voice mode is preferable to an alternative packet data mode that may be available. This determination of which mode is preferred is based on any of a range of criteria to be discussed below. If it is determined that voice is not the primary medium, either because voice is not suitable for data transmission, or because the data mode is determined to be preferred, the accessory circuitry in step 206 then formats the message for the packet mode that has been determined in steps 102, 104, 106 to be available. In the preferred embodiment example, SMS is employed, although any other packet mode or other data transmission protocol may be employed, as may any other mode of data transmission. In step 210, the accessory requests the phone to send the formatted data via the selected transport mode. This is achieved by transmitting through the accessory-phone connector conventional commands, such as AT commands, modem code/tones corresponding to the commands and message content.

If, in step 204, it is determined that voice is the primary transmission mode, the accessory circuitry then determines in step 212 whether the phone is in the midst of an active call. That is, whether the user is "on the phone" or the phone is in talk mode. If not, then in step 214 the accessory requests the phone to call a selected phone number, using the voice communications mode available. The selected number is stored in the Transport Policy Management table stored in the accessory, and corresponds to the call center. In step 216, the phone makes the call, upon which the phone is connected in a call in step 220.

If the phone is determined in step 212 to already be in the midst of a call, it proceeds directly to step 220. While connected to the call center (or to the destination to which a call is already placed), the accessory prepares a message including the GPS location information in a transmissible format, such as using AT codes. Then, in step 224, the accessory commands the phone to activate a mute function, so that the call is muted briefly. During the mute interval, in step 226, the accessory sends the GPS data encoded via its modem circuitry using the voice channel. Essentially, the phone mutes the preexisting call, and uses the existing voice call to the call center to transmit the data. This occurs during an adequately brief interval that it does not impair a conversation on the voice line. In addition, measures may be taken to buffer incoming and outgoing voice signals, so that they may be time-compressed and replayed immediately after the hold interval to avoid minimal loss of words or syllables. In step 230, the Call Center Server sends an acknowledgement signal back to the phone when the end of the sent data string has been received. This triggers the phone to de-activate the mute function, so that any preexisting call may continue.

With the call center having the user's GPS data, it then processes this data to determine the user's location. Typically, this will yield a Latitude-Longitude location, or a definite location under another coordinate system. Such a location may be converted to any other useful format. Alternative formats include nearest street address, graphical representation on a map, and the like. This information may be sent back to the user by similar channels as the data was transmitted to the call center. The information may be in a readable text format (such as for nearest address), graphical format (for transmission of a map image) or acoustic format (for dictated directions or location information.)

The accessory achieves advantages by selecting from among several alternative communications modes. The selection may alternatively be made by the call center, because it may possess information that allows the optimization of mode selection. In either event (or if both the accessory and call center contribute data to the mode decision), a wide range of criteria may be used to determine the mode. Factors may include: the availability of bandwidth of alternative modes, the speed of transmission (elapsed time to transmit), the criticality of data to be transmitted, the robustness against data errors, the least cost, present availability, latency inherent from the network available resources or lack of the base station signal strength to the cellular phone, user preferences, cellular carrier preference, data type (i.e. credit card number,) and cellular roaming status. Algorithms may be applied that consider multiple of these factors. For example, a preferred algorithm may entail: including encryption and compression to maximize the throughput and ensure security of the critical data.

The system may also optionally be set up to operate without any intervention by the user. The call center, or another user remote from the handset, may initiate a query of the handset of its location, A session is initiated by the call center to the handset via SMS, GPRS message or using an actual voice call, and a string of control codes triggers the GPS unit to download location information, which may be transmitted as discussed above. This information may then be reported to another location. For instance, a parent may query a handset carried by a child, to monitor the child's location. Other applications include monitoring of transportation, delivery, or emergency personnel for dispatch purposes. The nearest taxi, police cruiser, or delivery van may be dispatched to a desired location to reduce mileage costs and to speed up service.

The system may also operate for "geographical fencing" of the accessory. This entails programming the accessory to generate a communication when the GPS data indicates that it has departed from the boundaries of a pre-determined area. This may be used to prevent theft, to improve personnel efficiency and reliability, or for other purposes. As with the systems noted above, the location information may be transmitted to the call center for processing, or may be transmitted to a third party.

The GPS function may be aided by the wireless capabilities of the telephone handset. To improve accuracy, or to provide at least approximate location when out of GPS signal range, wireless functions may provide location information. Such functions may include cell identity, signal strength, cell sector, Time Of Arrival (TOA) and Enhanced Observed Time Difference(E-OTD). The location data may be supplemented with partial GPS data from less than all needed satellites, including the information of which satellites are in view of the user. All information may be transmitted in raw or limited form to the call center for analysis with the computing power and ephemeris data unavailable at the handset.

While the above is discussed in terms of preferred and alternative embodiments, the invention is not intended to be so limited.

The invention claimed is:

1. A method of wireless communication of digital data comprising:
    providing a mobile unit comprising an accessory device coupled to a wireless telephone handset and operable to communicate in a plurality of alternative modes of digital wireless communication, including at least one packet data mode and a voice mode for establishing a call over a voice channel;
    operating the mobile unit to assess at least a selected characteristic of each of the alternative modes;
    based on the assessment, determining a preferred mode; and
    if the preferred mode is the voice mode, transmitting a first digital data set from the mobile unit via the voice mode without significantly interrupting human speech communications over the same voice channel call.

2. The method of claim 1 wherein the selected characteristic is selected from a group of characteristics comprising return signal strength, cost, available bandwidth, transmission speed, User preference, Carrier Preference, data type and Cellular Roaming.

3. The method of claim 2 wherein the selected characteristic is the result of a function of at least a plurality of the members of the group of characteristics.

4. The method of claim 1 wherein the first digital data set transmission comprises transmitting the data to a call center; the method further comprising:
    processing the transmitted first digital data set at the call center to generate a second digital data set; and
    receiving the second digital data set from the call center.

5. The method of claim 4 further comprising:
    receiving a geographic location signal at the mobile unit; and
    processing the geographic location signal to form location data.

6. The method of claim 5 wherein the first digital data set transmission to the call center comprises the location data, and the second digital data set received from the call center comprises location information.

7. The method of claim 6 wherein the received location information is in a format selected from the group consisting of text graphic, and audio.

8. The method of claim 1 wherein the first digital data set transmission occurs in response to a communication received via a wireless telecommunications network from a location remote from the mobile unit.

9. The method of claim 8 including the mobile unit determining its location and the first digital data set transmission comprises transmitting location information in response to the received communication.

10. The method of claim 1 wherein the first digital data set transmission includes directing the data to a second mobile wireless unit.

11. A multi-mode digital wireless communication system comprising:
    a call center having a server connected to the Internet and to a wireless telecommunication network;
    the call center being operable to communicate with a remote unit via a plurality of modes selected from the group of modes including voice and data calls via the wireless telecommunication network,
    wherein the call center is operable to receive a first data set comprising location data from the remote unit and to process the first data set to generate a second data set comprising location information; and
    the call center is further operable to transmit the second data set to the remote unit.

12. The system of claim 11 wherein the format of the second data set is selected from the group consisting of text, graphic, and audio.

13. The system of claim 11 wherein the call center is operable to query the remote unit to initiate the remote unit determining its own location and transmitting the first data set back to the call center.

14. A method of sending geographic location data from a wireless telephone mobile unit comprising the steps of:
    at the mobile unit, receiving an external request to send location data;
    responsive to said external request, obtaining location data from a GPS unit coupled to the mobile unit;
    determining whether a voice mode is a primary transmission mode for location data transmission;
    if said voice mode is the primary transmission mode for said location data transmission, determining whether a call is currently active;
    if no call is currently active, establishing a voice mode call over a voice channel to a predetermined call center;
    converting the location data to a selected format for transmission over the voice channel; and
    muting the call and then transmitting the location data over the voice channel to the call center.

15. The method of sending geographic location data from a wireless telephone mobile unit according to claim 14 and further comprising:
  receiving acknowledgement from the call center that the location data was received; and,
  in response to the acknowledgement, discontinue said muting the voice mode call.

16. The method of sending geographic location data from a wireless telephone mobile unit according to claim 14 wherein the call center is a 911 emergency call receiving center.

17. The method of sending geographic location data from a wireless telephone mobile unit according to claim 14 wherein said muting and transmitting steps are carried out during a mute interval and further comprising selecting the mute interval such that the mute interval does not impair a conversation on the voice channel, thereby enabling substantially continuous voice contact with the call center while also transmitting the location data.

18. The method of sending geographic location data from a wireless telephone mobile unit according to claim 17 and further comprising:
  buffering voice signals generated during said muting interval;
  time compressing said buffered voice signals; and
  replaying said buffered and compressed voice signals immediately after a conclusion of said muting interval so as to minimize loss of voice information.

19. The method of sending geographic location data from a wireless telephone mobile unit according to claim 14 wherein the external request comprises pressing a button located on the mobile unit.

20. The method of sending geographic location data from a wireless telephone mobile unit according to claim 14 wherein the external request comprises pressing a button located on an accessory unit operatively connected to the mobile unit.

21. The method of sending geographic location data from a wireless telephone mobile unit according to claim 14 wherein the external request comprises a query from an entity located remote from the wireless telephone mobile unit.

22. The method of sending geographic location data from a wireless telephone mobile unit according to claim 21 wherein the query from an entity located remote from the wireless telephone mobile unit is transmitted to the mobile unit via a voice mode call.

23. The method of sending geographic location data from a wireless telephone mobile unit according to claim 21 wherein the query from an entity located remote from the wireless telephone mobile unit is transmitted to the mobile unit via a digital data transmission protocol.

24. The method of sending geographic location data from a wireless telephone mobile unit according to claim 23 wherein the query from an entity located remote from the wireless telephone mobile unit is transmitted to the mobile unit via an Internet Protocol.

25. The method of sending geographic location data from a wireless telephone mobile unit according to claim 21 wherein the entity located remote from the wireless telephone mobile unit comprises said call center.

26. The method of sending geographic location data from a wireless telephone mobile unit according to claim 21 and further comprising, at the call center, determining a signal quality of the voice mode call, and signaling the mobile unit to change transmission mode if the determined signal quality does not meet a predetermined signal quality criterion.

27. A method of automatically sending geographic location data from a wireless telephone mobile unit comprising the steps of:
  obtaining location data from a GPS unit attached to the mobile unit;
  establishing a voice mode call over a voice channel from the mobile unit to a predetermined call center;
  convening the location data to audio frequency tones;
  automatically muting any voice communication on the call;
  transmitting the converted location data in the voice channel to the call center; and
  automatically un-muting die voice communication on the call.

28. The method of sending geographic location data from a wireless telephone mobile unit according to claim 27 wherein said muting, transmitting and un-muting steps are carried out during a mute interval and further comprising selecting the mute interval such that the mute interval does not impair a conversation on the voice channel, thereby enabling substantially continuous voice contact with the call center while simultaneously transmitting the location data via the voice channel.

29. The method of sending geographic location data from a wireless telephone mobile unit according to claim 27 and further comprising, at the call center, requesting updated location data from the mobile unit.

30. The method of sending geographic location data from a wireless telephone mobile unit according to claim 27 and further comprising, at the call center, processing the received location data to determine location-specific information.

31. The method of sending geographic location data from a wireless telephone mobile unit according to claim 30 and wherein the location-specific information comprises at least one of latitude-longitude location, nearest street address, and geographical representation on a map.

32. The method of sending geographic location data from a wireless telephone mobile unit according to claim 30 and further comprising transmitting the determined location-specific information from the call center to the mobile unit over the established voice mode call.

33. The method of sending geographic location data from a wireless telephone mobile unit according to claim 30 and further comprising transmitting the determined location-specific information from the call center to the mobile unit over a separate digital data channel.

34. The method of sending geographic location data from a wireless telephone mobile unit according to claim 30 further comprising, at the call center, determining a signal quality of the voice mode call at the call center and signaling the mobile unit to change transmission mode if predetermined signal quality criteria are not met.

* * * * *

UNITED STATES PATENT AND TRADEMARK OFFICE
CERTIFICATE OF CORRECTION

| | | |
|---|---|---|
| PATENT NO. | : 7,215,965 B2 | Page 1 of 1 |
| APPLICATION NO. | : 10/016631 | |
| DATED | : May 8, 2007 | |
| INVENTOR(S) | : Andre F. A. Fournier et al. | |

It is certified that error appears in the above-identified patent and that said Letters Patent is hereby corrected as shown below:

In Column 1, Line 35, replace "mode" with --modes--.

In Column 3, Line 51, replace "type" with --types--.

In Column 4, Line 59, replace "its" with --with--.

In Column 5, Line 19, replace "use" with --used--.

In Column 10, Line 14, replace "convening" with --converting--.

In Column 10, Line 19, replace "die" with --the--.

Signed and Sealed this

Third Day of July, 2007

JON W. DUDAS
*Director of the United States Patent and Trademark Office*